United States Patent [19]

Dwyer

[11] 4,363,078
[45] Dec. 7, 1982

[54] MINIATURE ELECTROLYTIC CAPACITOR WITH ANCHORING TERMINAL

[75] Inventor: James F. Dwyer, Hillsville, Va.
[73] Assignee: Sprague Electric Company, North Adams, Mass.
[21] Appl. No.: 141,240
[22] Filed: Apr. 17, 1980
[51] Int. Cl.³ .............................................. H01G 9/00
[52] U.S. Cl. ...................................................... 361/433
[58] Field of Search ..................... 361/433; 339/184 R, 339/184 M, 184 T, 186 R, 186 M, 186 T, 221 R, 221 M, 278 A; 174/52 S

[56] References Cited

U.S. PATENT DOCUMENTS

| | | | |
|---|---|---|---|
| 1,690,232 | 11/1928 | Kuhn | 339/186 T |
| 2,015,421 | 9/1935 | Eckstein et al. | 339/221 R |
| 2,597,338 | 5/1952 | Kohring | 339/221 R |
| 2,970,182 | 1/1961 | Miquelis | 361/433 |
| 2,997,681 | 8/1961 | Klassen | 339/184 R |
| 3,614,545 | 10/1971 | Roese | 361/433 |
| 4,037,142 | 7/1977 | Poole | 361/433 |

FOREIGN PATENT DOCUMENTS

| | | | |
|---|---|---|---|
| 626413 | 10/1961 | Italy | 361/433 |
| 1060271 | 3/1967 | United Kingdom | 339/221 R |

OTHER PUBLICATIONS

Meiboom, "Miniature Pluggable Contacts", *IBM Technical Disclosure Bulletin*, vol. 5, No. 5, Oct. 1962, p. 26.

*Primary Examiner*—James W. Davie

[57] ABSTRACT

An anchoring terminal is secured in an elastomer seal, which is under compression in an end of a sealed miniature electrolytic capacitor, by forcing the terminal less than all the way through the compressed seal. The anchoring terminal is positioned in the seal with respect to the active capacitor leads through the seal so that the anchoring terminal provides stability and ensures proper polarity for mounting the capacitor on a wiring board.

4 Claims, 4 Drawing Figures

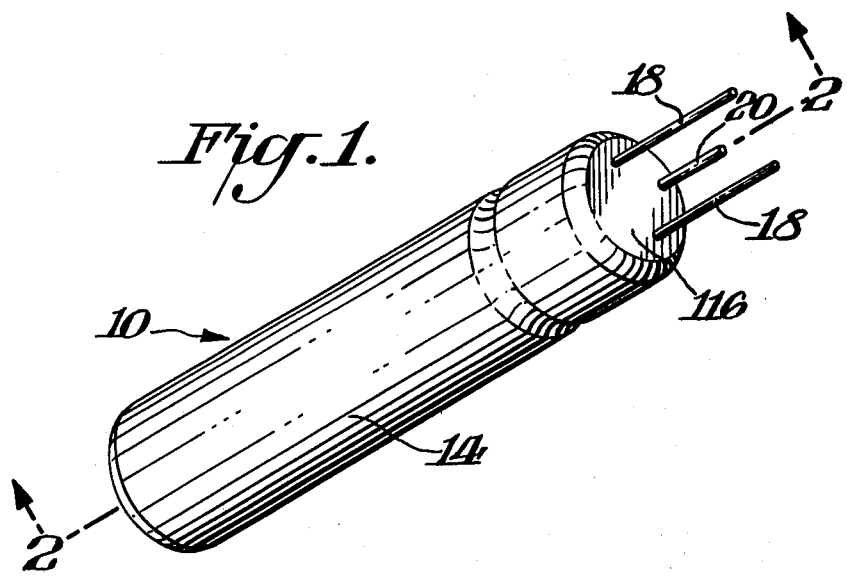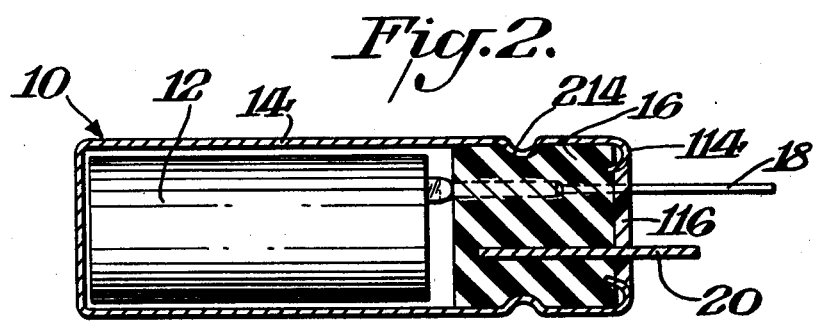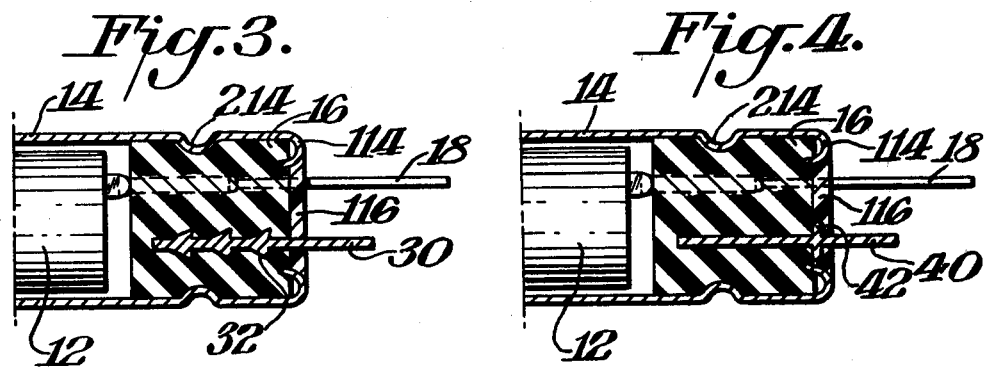

though some markets exist for capacitors with standard length leads, the provision of two such leads with a third different one is preferred. For example in a capacitor of about 10 millimeter (mm) diameter, working leads 18 are of about 0.6 mm diameter and 25 mm length. Anchoring terminal 20 is preferably made of 0.8 mm diameter tinned copper clad steel wire and is about 5 mm long. Thus there are three ready identifiable terminals of capacitor 10.

MINIATURE ELECTROLYTIC CAPACITOR WITH ANCHORING TERMINAL

BACKGROUND OF THE INVENTION

This invention relates to a miniature electrolytic capacitor with an anchoring terminal, and more particularly to the mounting of an anchoring terminal in the seal of such a capacitor.

Anchoring terminals have been employed in the electrolytic capacitor art, particularly in miniature capacitors which are less than an inch in diameter, so as to provide mechanical stability to the capacitor when mounted on a wiring board. Anchoring terminals have been offset from the other terminals of a capacitor so as to serve to prevent assembly of the capacitor into a wiring board in a reverse polarity configuration. The term anchoring terminal is applied to a terminal that is not in electrical connection to any of the electrodes of the capacitor; hence, an anchoring terminal is also known as a floating terminal, a dummy terminal, or a third lead.

It has been the practice in the art to secure anchoring terminals in cover assemblies prior to sealing the capacitors, as by molding or other mechanical means which thereby committed the cover assemblies to a single capacitor type.

SUMMARY OF THE INVENTION

A feature of this invention is the provision of a simplified anchoring terminal construction in a miniature electrolytic capacitor. Another feature is the provision of a simplified anchoring terminal insertion into the seal of a fully assembled capacitor. Another feature is the provision of a simplified anchoring terminal that provides all of the prior art requirements of stability and polarity determination for the mounting of a miniature electrolytic capacitor, as for example on a wiring board.

In accordance with this invention an anchoring terminal is secured in an elastomer seal which is under compression in a completed minature electrolytic capacitor. Insertion of the anchoring terminal into a compressed seal permits accuracy in the selection of location of the terminal without need for orientation of the seal in the capacitor.

BRIEF DESCRIPTION OF THE DRAWING

In a drawing which illustrates embodiments of this invention,

FIG. 1 is a perspective of a miniature electrolytic capacitor including an anchoring terminal, FIG. 2 is a cross-section taken along line 2—2 of FIG. 1, FIG. 3 is a fragmentary cross-section of another embodiment of anchoring terminal, and FIG. 4 is a fragmentary cross-section of still another embodiment of anchoring terminal.

DESCRIPTION OF THE PREFERRED EMBODIMENTS

FIGS. 1 and 2 show a miniature electrolytic capacitor 10. In the context of this invention the term "miniature" is intended to denote capacitors of about one inch (approx. 26 mm) or less in diameter. The anchoring terminal construction of this invention is usable in large diameter units; but, the greater compressive forces in a miniature capacitor seal provide the best utility for the assembly of this invention.

Capacitor 10 includes an electrolytic capacitor section 12 of any convolutely wound foil configuration known to the art. The specific construction of section 12 is not essential to this invention; nor is the type of electrolyte employed in section 12, so long as the electrolyte is compatible with the other parts of the capacitor, particularly any sealing members. In general, capacitor section 12 comprises at least two aluminum foils, with at least one of the foils bearing a dielectric oxide to serve as the dielectric of the capacitor section. The foils are convolutely wound with conventional intervening spacers so as to protect the dielectric oxide, prevent shorting between the foils, and serve as a wick to hold the electrolyte in operative contact with the electrodes.

Capacitor section 12 is provided with lead assemblies that are connected to the various metal foils making up the section. The lead assemblies are preferably of the type shown by Poole in FIG. 4 of U.S. Pat. No. 4,037,142 issued July 19, 1977. One such lead assembly 18 is shown in FIG. 2 of this invention. As shown in FIG. 1, there is at least one lead 18 extending from capacitor 10 so as to facilitate electrical access to capacitor section 12. Leads 18 may be of different lengths in the case of a polar capacitor in order to identify the anode and cathode foils of the section.

Capacitor section 12 is housed within can 14, which is preferably of aluminum, although any can material known to the art that is compatible with section 12 and its electrolyte is operable in this invention. Can 14 is closed at its open end by an elastomer seal 16 in the form of a grommet or bung. The seal utilized in the above-identified U.S. Pat. No. 4,037,142 is highly satisfactory in the assembly of this invention. Preferably both can 14 and seal 16 are of substantially cylindrical configuration, which permits ease and security of sealing of capacitor 10.

Seal 16 may be made of any of the elastomers known to the capacitor art for their ability to provide effective and long lasting sealing of capacitor electrolytes. Butyl rubber is preferred with harsh electrolytes such as DMF based solutions, while ethylene propylene rubber permits effective seals for glycol based solutions.

Seal 16 is retained under compression within the open end of can 14. Seal 16 is of a size and shape so as to conform with the open end of can 14, and to be inserted with a snug fit therein. The seal is secured by rolling lip 114 of can 14 over onto seal 16, and by spinning a circumferential groove portion 214 of can 14 into seal 16. Other compressive techniques, such as extrusion sealing, may be employed to compress seal 16 in the open mouth of can 14.

Anchoring terminal 20 is provided in capacitor 10 for the purposes of greater stability for the capacitor in the mounting of the capacitor on a wiring board, and also for ensuring against improper or reverse polarity insertion of the capacitor in the wiring board. This latter or so-called "idiot proofing" feature is accomplished most simply by positioning the anchoring terminal 20 out of the plane of working leads 18, and preferably near the rim 114 of can 14. It is also preferred to fabricate the anchoring terminal 20 of an external length that is distinctive from the lengths of working leads 18, so as to facilitate identification of the several leads.

Anchoring terminal 20 is made of any of the materials that are used in the capacitor art for leads, such as tinned copper or tinned copper clad on a steel core. In a like manner, the size and shape of anchoring terminal 20 are not critical to this invention. The size is preferably of a diameter slightly different from the size of working leads 18 so as to further aid in the indexing or polarity mounting function. The shape may be of circular or any other cross-section that is common in the art, although the circular cross-section is preferred because of better sealing within a compressed grommet or bung.

Mounting of anchoring terminal 20 into seal 16 is readily accomplished by driving the terminal 20 into seal 16 so as to pierce seal 16 to a depth that is less than the full extent of the seal. In other words, terminal 20 extends into seal 16 short of the full thickness of the seal so that there is an imperforate inner surface of the seal that remains intact after the mounting has been completed.

Insertion of anchoring terminal 20 through the outer surface of seal 16, but not through the inner surface, may be obtained by controlling the depth of penetration, as by using a nail gun which projects a fixed length of wire into seal 16 and uses the outer surface of the seal as an abutment stop for the nozzle of the gun. No bore need be provided in the seal 16 to accomodate the insertion of anchor terminal 20. Indeed, no such bore is desired because driving terminal 20 into a solid imperforate portion of seal 16 enhances the compression of the seal material around the terminal.

The depth of penetration of anchoring terminal 20 into seal 16 need only be enough to secure the terminal within the seal against a lead-wire pull test in excess of one pound. It is preferred that terminal 20 extend into seal 16 beyond the groove 214 of can 14, which is the location of the greatest compression of seal 16. It is not essential to the proper securing of terminal 20 within seal 16 that the rolling of lip 114 and spinning of groove 214, or any other capacitor sealing technique, be completed prior to insertion of the terminal into the seal. However, a feature of this invention is found in the capability of adding anchoring terminal 20 to a fully completed capacitor. This feature avoids the costly inconvenience of having to maintain two construction procedures; one for units requiring anchoring terminals, and another for units without such terminals. This feature also eliminates all need for concern over the proper orientations of the terminal with respect to the active leads, and of the seal to the capacitor. In a similar vein, a feature of this invention is the avoidance of the prior art need to utilize mechanical means to secure anchoring terminals into seals prior to introduction of the seal into the capacitor.

Capacitor 10 is provided with an outer seal 116, preferably of poured epoxy material, which protects the capacitor against ingress of contaminants. The experience of the capacitor art teaches that the fluxes and the temperature used in soldering of capacitors into circuit boards provide contaminants that need be kept out of capacitors. Any commercial epoxy that has been employed in the capacitor art may be used in the capacitor assembly of this invention; e.g. Epi-Rez 510 by Celanese Corp. or Epocap by Hardman Resins with conventional hardeners and fillers are poured and cured in place.

Rolled lip 114 of can 14 provides the only form that is needed to contain seal 116 in its liquid state. Cured seal 116 is preferably essentially flush with the outer extension of lip 114, and is sealed thereto during curing. Resin outer seal 116 is also bonded to the leads 18 and anchor terminal 20 during curing of the resin. Bonding of seal 116 to anchor terminal 20 serves to further secure terminal 20 in capacitor 10; the pull-test resistance is enhanced several fold, so as to approach the level of the standard capacitor lead-wire test of about five pounds.

Anchoring terminal 20 as shown in FIG. 2 is of plain wire construction. Increased resistance to removal of the terminal from the seal is obtained by the provision of any of the conventional anchoring means on the terminal. Barbs of the terminal are shown in FIG. 3, wherein anchoring terminal 30 contains regions 32 having projections which bite into the seal material in opposition to any force tending to remove the terminal from the seal.

Although mechanical means are readily available to limit the extent of insertion of an anchoring terminal into the seal, the terminal itself may include a stop member to ensure uniformity of penetration of the terminal into the seal. Anchoring terminal 40 is shown in FIG. 4 with an integral stop member 42 which is of sufficient lateral extent on the outer surface of seal 16 so as to constitute a positive stop against further penetration of terminal 40. Stop member 42 becomes another form of anchoring projection when used in conjunction with outer seal 116; with member 42 being buried within seal 116.

While only one anchoring terminal 20 has been shown in the drawing, it should be understood that the use of additional anchoring terminals is within the scope of this invention. The additional terminals provide additional stability for mounting the capacitor, and also offer the symmetry required by some mountings in which the capacitor must be inserted.

What is claimed is:

1. A miniature electrolytic capacitor having a capacitor section housing in a can, wherein the improvement comprises the open end of said can being closed by an elastomer seal, said seal being held under compression within said open end by a circumferential groove in said can, at least one electrical lead from said capacitor section passing through said seal, and an anchor terminal being secured in said seal with one end of said anchor terminal extending outwardly from the outer surface of said seal and with the other end of said anchor terminal beyond said groove and stopping short of the inner surface of said seal.

2. The capacitor of claim 1 wherein said anchor terminal includes anchoring means on said terminal within said seal.

3. The capacitor of claim 1 wherein said anchor terminal includes a stop member abutting said outer surface of said seal.

4. The capacitor of claim 1 wherein an outer sealing member is provided over said seal, said member being bonded to said anchor terminal.

* * * * *

UNITED STATES PATENT AND TRADEMARK OFFICE
CERTIFICATE OF CORRECTION

PATENT NO. : 4,363,078
DATED : December 7, 1982
INVENTOR(S) : James F. Dwyer

It is certified that error appears in the above—identified patent and that said Letters Patent is hereby corrected as shown below:

Column 1, line 43, "minature" should read -- miniature --
Column 4, line 16, "of" should read -- on --
Claim 1, line 2 (Column 4, line 42), "housing" should read -- housed --

Signed and Sealed this

First Day of February 1983

[SEAL]

Attest:

GERALD J. MOSSINGHOFF

Attesting Officer    Commissioner of Patents and Trademarks